(12) United States Patent
Butler (10) Patent No.: US 10,263,463 B2
(45) Date of Patent: *Apr. 16, 2019

(54) DEVICE MONITORING PREVENTION IN POWER SYSTEMS

(71) Applicant: SMART BLOCK LLC, Gainesville, FL (US)

(72) Inventor: Sean Butler, Gainesville, FL (US)

(73) Assignee: Smart Block, Gainesville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/935,603

(22) Filed: Mar. 26, 2018

(65) Prior Publication Data
US 2018/0219413 A1 Aug. 2, 2018

Related U.S. Application Data

(63) Continuation-in-part of application No. 14/672,975, filed on Mar. 30, 2015, now Pat. No. 9,928,978.

(51) Int. Cl.
*H02J 3/00* (2006.01)
*H02J 13/00* (2006.01)

(52) U.S. Cl.
CPC ............ *H02J 13/0017* (2013.01); *H02J 3/00* (2013.01); *H02J 2003/007* (2013.01)

(58) Field of Classification Search
CPC .................................. H01H 47/00; H02J 3/00
See application file for complete search history.

(56) References Cited

U.S. PATENT DOCUMENTS 9,928,978 B1 * 3/2018 Butler .................... H01H 47/00

* cited by examiner

*Primary Examiner* — Jeffrey M Shin
(74) *Attorney, Agent, or Firm* — Maxwell L. Minch; GrayRobinson, P.A.

(57) ABSTRACT

Devices, systems and methods are provided that introduce electrical components to alter the electrical characteristics of power delivery systems in residential and commercial power circuits to: prevent the disaggregation of electrical utility consumption data by alteration of the composite load profiles. The device and method prevent accurate identification of powered devices, their presence, their operating characteristics, their consumption data, and any inferences of power device user's behaviors and activities by the analysis of disaggregated data. The operation of the device may include any of a range of steps, actions and instructions to introduce altering impedance elements and filtration circuits in coordinated fashion with the operation of the targeted devices to be masked.

14 Claims, 7 Drawing Sheets

DEVICE MONITORING PREVENTION IN POWER SYSTEMS

CROSS-REFERENCE TO RELATED APPLICATIONS

This application is a Continuation-In-Part of U.S. application Ser. No. 14/672,975, filed Mar. 30, 2015, which is incorporated by reference herein in its entirety.

FIELD OF INVENTION

The present invention pertains to systems and devices and methods for controlling the remote or external monitoring of electrical loads operating within discrete electric power supply systems such as conventional electrical power delivery systems for real property.

Remote or external monitoring of electrical power delivery systems is commonly referred to as Nonintrusive Load Monitoring (NILM). This monitoring is deployed by electrical utilities in both Advanced Metering Infrastructure (AMI) and smart meters. NILM includes processes for analyzing changes in parameters such as the voltage, current, phase relationships, noise, and harmonics created by loads in electrical power delivery systems and deducing the loads (e.g. appliances, environmental control systems, irrigation systems, pool filtration systems) powered by the electrical power delivery systems as well as the individual energy consumption and patterns of usage of such loads. Electric meters with NILM technology are used by utility companies to survey the specific uses of electric power in individual homes and other discrete users and spaces. This monitoring is accomplished without entering the space served by the electrical power delivery system being monitored and without specific knowledge of the electrical and electronic devices, loads, connected to the system. For this reason, NILM technology requires static, repetitive, and unique electrical characteristics in order to properly identify and track a discrete load.

A load profile or power system signal is a representation of the overall electrical data for a specific load, or loads, on a electrical power delivery system. It is a product of the impedance characteristics and operating history of all the electrical elements making up and connected to the system. Developing such a load profile or signal is one objective of NILM. Typically, NILM is incorporated as part of a utility meter or used in an upstream recording device electrically deployed for monitoring the electrical power delivery systems, often unknown to the occupants of the site being monitored.

Discerning information from a load profile typically requires disaggregation. Disaggregation is the process of separating the composite load profile information of the electrical power delivery system into discernable and discrete loads within the electrical power delivery system, to develop load signatures. A load signature is an assemblage of one or more electrically measurable parameters that changing over time and that can be perceived external to the load on the electrical power delivery system. Each signature is a unique electrical transient resulting from the initiating event, the on or initial energized state, through its normal steady-state operation, and until its terminating event, the shutdown or off state of the load. The load signature varies by the parameters that a NILM device records and/or tracks. When the parameters are analyzed, they can potentially reveal the identity of the device or appliance and its manufacturer, its type and potentially specific model, as well as its usage time, status (such as faulty or healthy) and power consumption.

Various and different electric load parameters may be measured by NILM devices and load signatures discerned from a load profile through disaggregation. Parameters of individual loads which may be identified and measured through disaggregation include: current; voltage; real, reactive, and apparent power (KW, KVAR, VA); admittance; harmonics; electrical noise at initiation, termination, and during steady-state; DC Bias current; peak voltage and peak current levels during initiation; duration of initiation transients; shape of initiation and termination transients; and power factor.

For a variety of reasons including maintaining privacy and security within a personal or commercial space receiving electrical power from an independent party source, it may be desirable to be able to limit or prevent NILM Smart devices from tracking electrical power delivery systems.

Thus there remains an unmet need for a device, method or system that may be introduced to an electrical power delivery system to mask, hide, obfuscate, simulate, or otherwise make indiscernible the discrete elements of a powered system and thereby disable or prevent detection and monitoring from externally connected NILM systems.

SUMMARY OF THE INVENTION

The present invention includes devices, systems and methods that sense electrical distribution system individual loads or aggregate systems and introduces impedance altering elements to the electric power systems in coordination with the operation of electrical or electronically powered devices connected to the electrical power delivery system to alter the electrical power delivery systems overall load characteristics or signal and thereby enhancing, obfuscating, misleading, inhibiting or preventing detection of the individual connected loads that may be accomplished through disaggregation of load profiles obtained through a NILM monitored power system. Operation of powered devices is detected or predetermined to enable introduction of electrical power delivery system impedance altering elements or circuits in coordination with the occurrence of characteristic events associated with the electrical systems loads. In this way the characteristics are either enhanced for more effective detection or masked from detection by external monitoring of the electrical power delivery system. In some embodiments, the present invention alters impedance elements of the electrical power delivery system that would simulate load signatures for loads which are not actually connected to the system, with negligible effects on energy consumption.

Enhanced detection may include current tracking; voltage; real, reactive, and apparent Power; (KW, KVAR, VA); admittance; harmonics; electrical noise at initiation, termination, and during steady-state operations of individual loads. Masking may include any of a variety of steps or actions or devices to introduce or alter impedance elements or filtration circuits in coordinated fashion with the operation of the targeted devices to be masked.

The invention includes devices and methods to more effectively track, impede or prevent load monitoring of electrical power delivery systems and associated power usage, remotely. It is not necessary nor critical in all applications to track or mask all electrically or electronically functioning elements or events of the involved electrical power delivery system continuously, only to apply tracking or masking elements in such a way as to enhance or disrupt the requirements of the particular capabilities of the monitoring technology desired to be impeded. Effective tracking or masking is determined by the ability to enhance, disabling or inhibit load analysis and disaggregation to the degree required for the particular intended result. The extent and nature of tracking or masking efforts may be tailored as needed to satisfy the size, scope and budget of the potential customer. In at least one embodiment, the method includes a step of determining or identifying characteristics of the power consuming devices to be masked. In at least one embodiment, the method further includes determining the specific capabilities of the NILM technology applied on the electrical power distribution system the devices are powered from.

In at least one embodiment of the invention, the inventive device includes an integrated system with components for sensing load electrical signal characteristics in an electrical power delivery system; a signal processing component that applies predetermined masking data and logic; and multiple impedance altering circuit elements controllable by the signal processing component and connectable to the electrical power delivery system.

In at least one embodiment of the invention, all the functional elements are integrated into a unitary device that includes a standard single phase, split phase or 3-phase electrical receptacle plug to be connected to the electrical power delivery system in a structure. The device receives operational power from the electrical power delivery system and in electrical connectivity with other devices connected to the electrical power delivery system, allowing it to sense initiation events of said devices and introduce masking circuit elements as circumstances dictate.

In some embodiments, a low pass filter will be deployed to filter load profiles and block any powerline communication, or PLC signals, on the electrical power delivery system without adversely affecting the ability of the inventive device to monitor and mask electrical power delivery system loads.

In various embodiments, impedance changing actions are taken in a substantially random scheme to introduce impedance values that are effective in masking patterns of operational use of a subject device or devices. Other novel aspects of the inventive method will be made clear by the associated illustrations and the below detailed description of embodiments of the invention and claims.

DETAILED DESCRIPTION

The present invention provides systems and methods for electrical signal masking, alteration, or obfuscation, which such events can be configured to operate independently, trigger on an event transient, commence on any electrical characteristic of a powered devices electrical characteristic curve, or be controlled manually to ensure the broadest possible application.

The following detailed description is merely exemplary in nature and is in no way intended to limit the scope of the invention, its application, or uses, which may vary. The invention is described with relation to the non-limiting definitions and terminology included herein. These definitions and terminology are not designed to function as a limitation on the scope or practice of the invention, but are presented for illustrative and descriptive purposes only. Various terms used throughout the specification and claims are defined as set forth below as it may be helpful to an understanding of the invention.

An "electric power delivery system" is a network of conductors, connectors, switches and controls that are established in a fixed space, such as a residential living unit or commercial business space such as an office, and is designed to allow electrical loads, or power consuming devices, to be connected for use. An "electric power delivery system" is connected to and receives power from, an outside power source, usually an electrical grid. For the avoidance of doubt, NILM devices used to collect data are typically used upstream from an electric power delivery system, either at the point of connection for the grid to the electric power delivery system by way of a transfer switch, breaker, or a meter. The NILM devices used to collect data may be implemented further upstream such within an transformer connection, distribution box, or on the powerlines of the grid themselves.

As used herein, "electrical loads", or "power consuming devices", means those electrical devices which are commonly used in a commercial or residential space, including, without limit, a refrigerator, a personal blow drier, a computer, a television, and any of a variety of devices that are electrically powered; and in a commercial business space, heavy machinery like presses and lathes and also office equipment like a computer, a computer network, a copier, printer, and other variety of electrical and electronic devices, also referred to as a load.

As used herein the terms "detect", "identify", and "monitor" and their various forms with respect to loads on an electrical power delivery system mean the identification of the presence and operation of a device directly or through identifying electrical signal or signatures. These terms include events and actions that identify only a presence of some unique discrete device without necessarily identifying or determining the physical nature, characteristics or condition of the device.

As used herein, the term "signal" means an electric potential and current and their temporal relationship, or other detectable characteristic of electric current in a conductor, that is a reflection of the load that is supplied power by connection to an electrical power delivery system and the impedance of the device or system of interest. While the electrical load characteristics and impedance of a load of interest are not actively created or propagated for the purpose of signaling, characteristics of a powered device load and impedance and changes in those characteristics are considered signals herein as conveying, or potentially conveying, information regarding the device. Herein, the concept of introducing, altering, and producing a signal is used for convenience to indicate the action and result of introducing or removing or altering one or more electric circuit components in the associated system such that the perceptible circuit characteristics, such as impedance, are altered.

Herein, the term "mask" and its forms mean efforts and steps and devices that introduce, alter or produce a signal, or alter system electric signals, in a power system including powered devices such to produce a substantially different power system signal. Effective masking produces a power system signal that is not susceptible to disaggregation to determine the loads being powered by the components of the signal produced by, and can identify, subject powered devices.

In prior conventional electrical system device monitoring operations the state and timing of operation of individual power consuming devices in a power system may be identified by electrical power signal characteristics perceivable (if unaltered) at the connection to the power delivery system by a conventional smart meter or other similarly functioning NILM devices connected to the power supply system or power delivery system. A powered device might have been identified by detected electrical characteristics of known devices such as impedance or operational load timing. For example, an air conditioning compressor may have a known voltage and current transients that correspond with start and stop cycles of an air conditioning cooling system. Alternatively, the same air conditioning compressor may have certain operating characteristics, such as impedance or harmonics, which can be used to identify the type and even the make or manufacturer of the load. In other examples, the existence of an unknown unique discrete device may be detected based on repeated occurrences of the same signals over time. Signal characteristics that may be used to identify unique devices include, but are not limited to: voltage and voltage changes; current; real, reactive, and apparent power (KW, KVAR, VA); signal harmonics; electrical noise at start, stop, and during runtime; DC Bias current; peak voltage and peak current levels during start-up or normal operation; duration of start-up transients; shape of start-up and shutdown transients; power factor; and daily timing of power use. The present invention considers alteration or manipulation of each of these characteristics as potential effective masking efforts.

In any particular power delivery system of interest, the particular connected electrical loads, existing or anticipated to be used, define in part the characteristics or parameters that must be addressed by masking to accomplish the desired disabling of system monitoring. As well as the devices themselves and their electrical operational characteristics, the nature of their use in the power delivery system define relevant device characteristics. Among others, the device connection and disconnection timing relative to a human user's operation and their connection and disconnection timing relative to the use of other devices may also define relevant characteristics.

Figure 1:
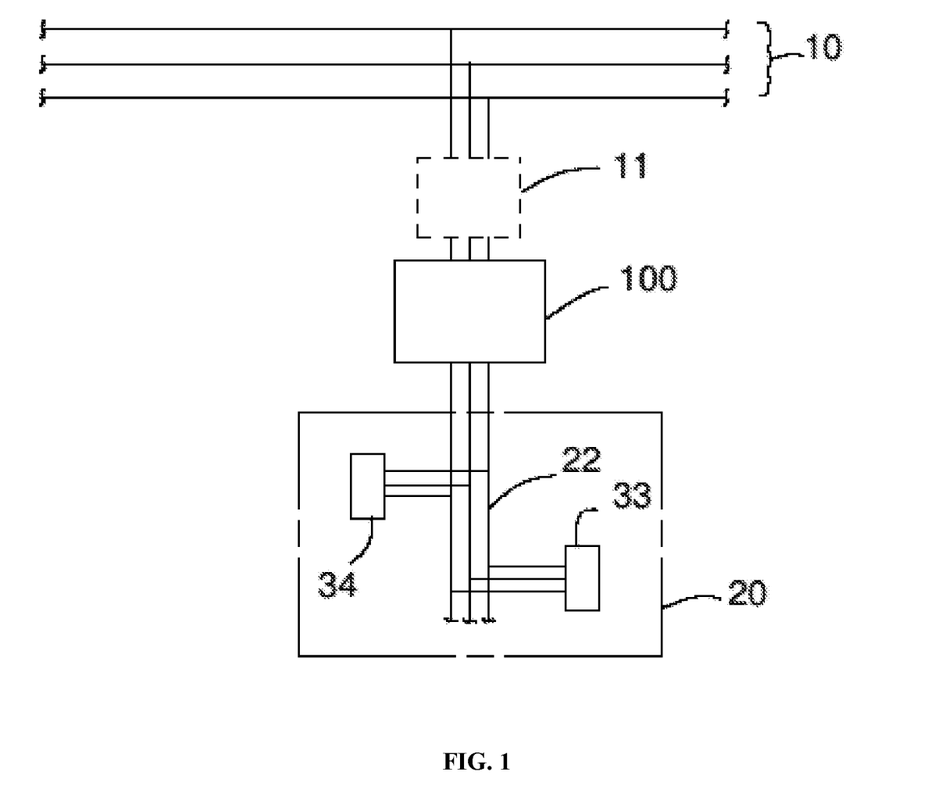
FIG. 1 depicts a system according to the invention, connected between a power delivery system and conventional electrical power supply system.
Figure 2:
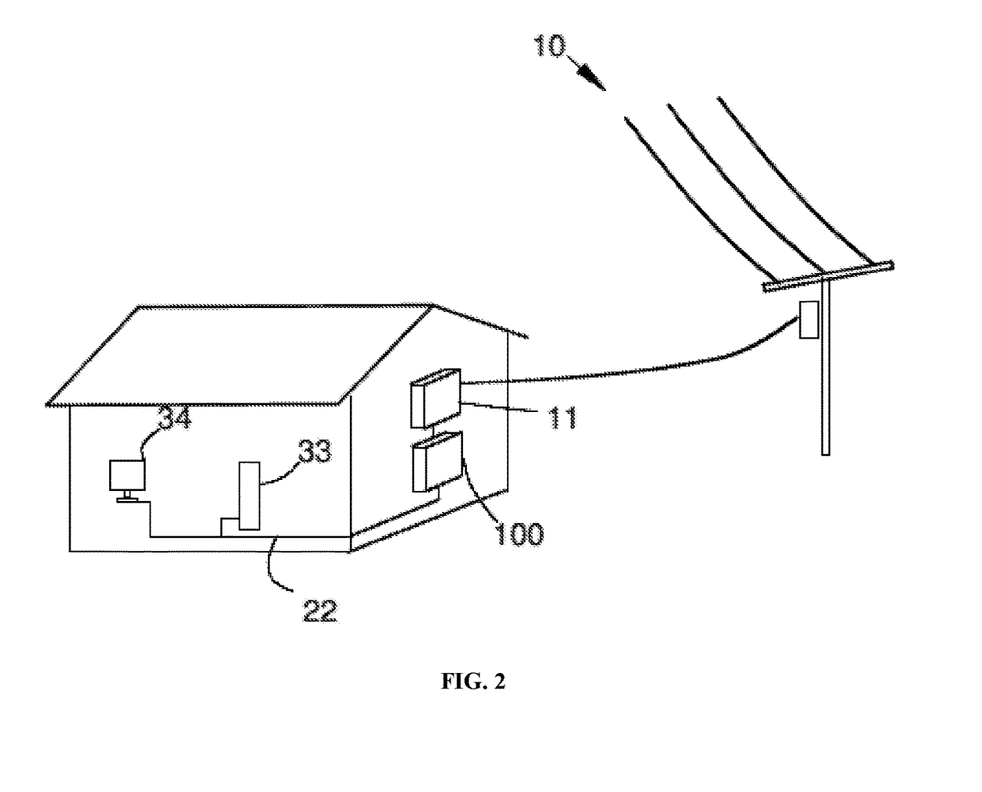
FIG. 2 depicts an example application of a system with the components depicted in FIG. 1.

FIG. 1 is one configuration of an inventive "Inventive device" system, according to the invention, connected between a power delivery system and conventional electrical power supply system. FIG. 2 depicts an example application of a system with the components depicted in FIG. 1. The invention is intended to operate in conjunction with or associated with both a conventional electric power supply system 10 and an electrical power delivery system 20. The power supply system 10 is most typically composed of elements of a municipal power supply system such as is provided by many electric utility companies. This is most typically an alternating current (AC) system of single phase and two phases/split phase that is conducted through a network of above-ground or buried conductors connecting power utility company power generators to customer power delivery systems.

Electric power customer or consumers connect power consuming devices to the provided power supply system network typically through a customer power delivery system such as represented here. The power delivery system 20 may be a simple or complex network of conductors and connectors arranged to accommodate known or anticipated power consuming devices. In FIG. 1 the power delivery system 20 is depicted schematically with conventional conductors 22 connecting different powered devices 33, 34. While three parallel conductors (representing conventional single and three-phase current) are shown, this is not limiting and many such existing systems are only two-phase and split phase.

In FIG. 2, the power delivery system is illustrated as a simplified typical internal electrical wiring system of a conventional residential building (various elements such as receptacles and junction boxes are left out for clarity). As illustrated, the power delivery system 20 is designed to provide electrical power connection to powered devices 33, 34. It should be clear that a particular power delivery system may have any of infinite different configurations and characteristics and may include any of a great variety of, and combinations of, different power consuming devices.

To accomplish the desired masking, the inventive 100 device or system, according to the invention, is connected to, or integrated into, the power supply system 10, preferably between the power supply system and the power delivery system 20.

The inventive device represents the functional elements of one embodiment of the invention. A conventional monitoring device 11, such as what is commonly referred to as a "smart meter" may be incidentally connected to the power supply system 10 but the existence or operation of the smart meter or other monitoring device is not necessary for the function of the invention. The inventive device is illustrated as a single element but may be formed of multiple physically separated elements that are functionally connected.

The function of the inventive device is to introduce masking signals simultaneous with the powered device signals or at other times during monitoring periods to substantially or effectively mask the identity of a powered devices either during startup transients, shutdown transients, or during their normal operation. The nature of an effective masking effort or signal is dependent in part on the characteristics of the powered device signal that enable identifying the device, as well as the capabilities of the incidental monitoring system.

Where the objective of the masking efforts is to mask the identity of a particular powered device among a family of similar devices, the requirements of the masking efforts may be satisfied by altering the signal of the particular device sufficiently that the perceived (monitored) signal is more representative of other devices among the family of similar devices.

For example, a family of different residential refrigerator models may each draw 2 amperes of current at 110 volts AC, but each have a different maximum current during a startup transient. Effective masking to prevent identifying the particular refrigerator among the models may be accomplished by altering the perceived system startup current maximum an amount equal to the difference between the various different maximum currents. If, at each subsequent startup of the refrigerator, a different alteration of the current (addition or reduction) is introduced, it is possible to prevent establishing the identity of any particular refrigerator. In this way, if the power delivery system is monitored, it would be impossible to differentiate the particular refrigerator from the family of models based on comparison with the characteristic of the maximum current. It should be clear that the powered device (e.g. refrigerator) itself and its electric usage it not altered, all alternations are external to the device and within the associated power delivery system.

Figure 3:
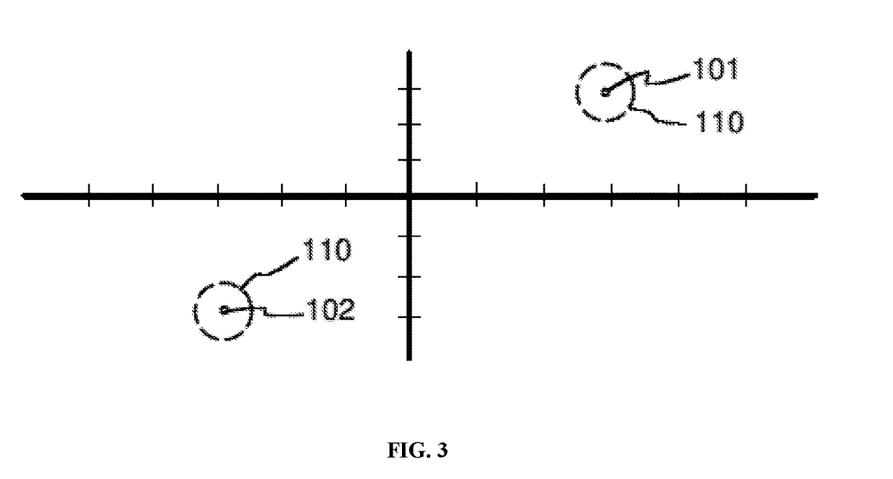
FIG. 3 is a graph of power consumption of a consumer appliance provided to illustrate masking requirements of the invention.

FIG. 3 is a graph of power consumption of a consumer appliance such as a refrigerator that uses both real power and reactive power during its power-on and power-off cycles. The figure's horizontal axis represents real power and the vertical axis represents reactive power. The points 101, 102 represent the characteristics of the appliance under conventional condition. With prior knowledge of these data points, a smart meter could discern the presence of the appliance by detecting these power values in the associated power delivery system. The dashed circles around each point 101, 102 represents the maximum deviation 110 of detected power signals from the known power value that enable the monitoring system to relate the signal to the actual appliance. This amount of this deviation (distance from the actual values) may be dependent on a range of factors, including the nature of the device being monitored, changes with the advances in monitoring technology, and changes in the characteristics of the device being monitored.

Figure 4:
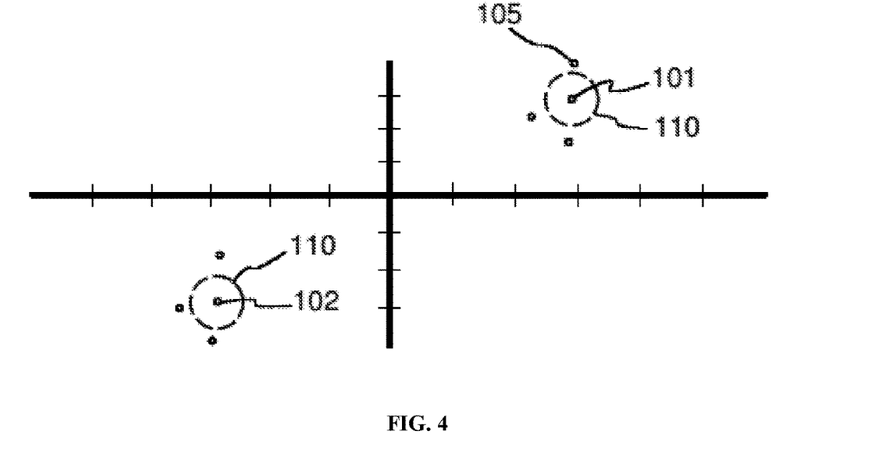
FIG. 4 is a graph of power consumption of a consumer appliance with masking applied according to the invention.

FIG. 4 is a graph of the power signal generated in the power delivery system associated with the same device as discussed regarding FIG. 3, combined with masking signals applied to the power delivery system according to the invention.

The masking signals have been configured to result in a combined power 105 which is outside the deviation 110. In this way, the monitoring system is hindered or disabled from determining the true value of the power, and thus the true identity of the appliance.

There may be one or more defining characteristics of a single powered device, or a family of similar devices. The amount and nature of the required alteration of the electrical signal may be a factor of a combination of characteristics of one or more different powered devices. In any case, successful masking requires alteration to the degree preventing resolution of the distinctions between those devices.

Successful masking requires prior knowledge of the potentially defining signal characteristics of the powered devices to be masked. It some cases, it is possible to apply effective masking signals to a system without regard to the temporal nature of the powered device signal in the system. For example, temporally random masking signals may be effective if properly designed with respect to the subject powered device signal.

In many cases it is preferred to coordinate, in time, the masking signals with the powered device signal to most effectively mask the defining characteristics of the device signal. Because, incidentally, most powered devices of interest have random or very intermittent use cycles, it is useful and preferred to include in the inventive masking system and methods a signal detection capability, step, component.

Figure 5:
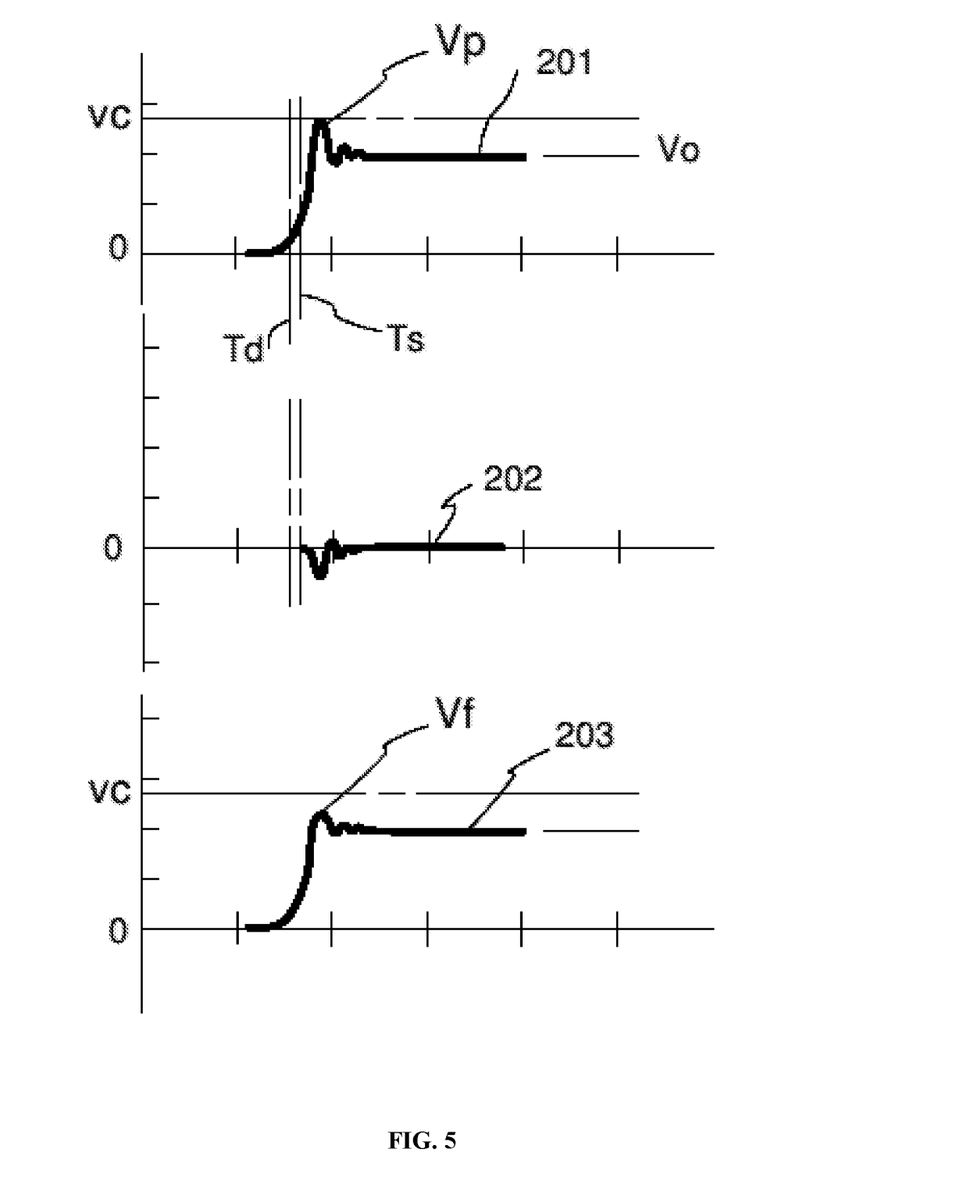
FIG. 5 are simultaneous plots of voltage over time for a powered device, a masking signal, and for the powered device with masking.

FIG. 5 illustrates the temporal application of a masking signal relative to a target powered device signal to be masked. FIG. 5 provides three time plots of signal voltage of: a powered device 201, a masking signal 202, and the resulting combined signal 203. The powered device signal 201 is the line voltage as could be detected and identified in the conductive circuit elements of a power delivery system 10 to which the powered device is connected. The masking signal 202 is the line voltage as would be detectable in the same power delivery system if applied alone, separated in time from the powered device or other signal generating devices. The combined signal 203 is the voltage signal similarly detected when the masking signal 202 is applied as suggested to mask, and prevent detection of, the powered device signal 201.

The powered device signal 201 is only generally representative of some characteristics of some powered devices and is not intended to be defining of any or all devices signals, nor limiting of the invention. Initially, the powered device signal 201 quickly rises to a peak value Vp equal to the signal maximum positive value Vc. Subsequently, the powered device signal 201 drops to a stable operating value Vo. The device may be identifiable if the signal maximum Vc is characteristic of the device, or alternatively, for example, the difference the signal maximum Vc and the operating value Vo may be characteristic. In such a case, the masking system monitors the power delivery system and detects the powered device signal 201 at a time Td. The masking system then applies appropriate circuit elements to the power delivery system to generate the masking signal 202 beginning at time Ts. The masking signal 202 is designed, with an initial negative value coincident with the peak Vp, to eliminate the defining characteristics when the signal on concurrent. After the initial masking period, the masking signal 202 is reduced to zero.

The combined signal 203 is what would be detected in the power delivery system when both the powered device signal 201 and masking signal 202 occur in the coordinated fashion as suggested. The new peak value Vf of the combined signal 203 is substantially below Vc and the characteristic value of the subject device. An incidental monitoring system attempting to identify the subject device through detection of a signal having Vc would be disabled.

The above mode of masking results in a combined signal that is repeated if the same masking signal is used. In some applications, it may be necessary to vary the masking signal over time in subsequent use events. Preferably, one or more of the characteristics of the masking signal is random. This may take the form of temporal variations, or signal amplitude variations or other variations of the characteristics of the masking signal. Addition of distinction masking signals, and use of multiple distinct masking signals is considered here to be a variation of the signal. While perfect randomness is often not possible, it is sufficient here that the variations or changes are substantially without pattern or discernable logic within the relevant time period.

In the above example, the masking activity was initiated by the detection of the start of device operation signaled by the increase, from zero, of voltage. A masking effort may be initiated by detection of any change in device signal. For example a device may have a distinct shutdown or termination cycle that must be masked to preclude its detection. In such a case, a change in voltage or current from steady-state operation may be the event to be detected.

Figure 6:
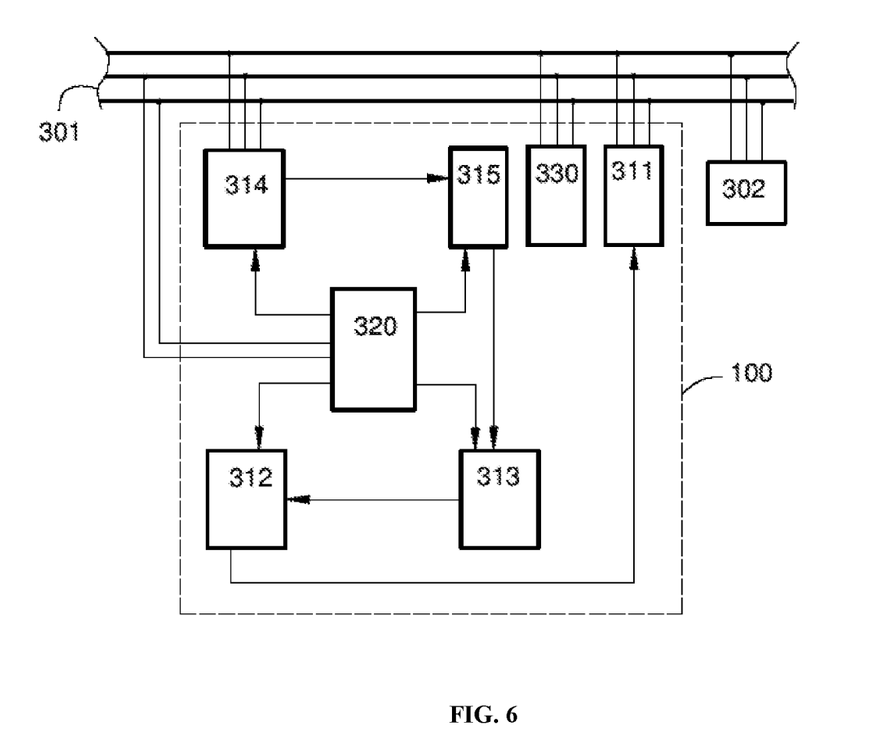
FIG. 6 is one embodiment of a masking system connected to a power supply system.

FIG. 6 is a schematic depiction of the elements of one exemplary configuration of a masking system according to the invention and its connectivity with a power delivery and a typical powered device.

Three conductors of a power delivery system 301 electrically connect both the masking system 100 and a subject powered device 302 to a power supply system (not shown). It should be clear that there may be no clear boundary between the elements of the power supply system and the power delivery system 301 and the elements connecting directly to the powered device. In many practical applications, there may be a power consumption meter owned and operated by a power supply system owner company, and this may provide an arbitrary boundary without relevance to the function of the masking system.

The functional elements of the masking system include impedance altering components 311 that provide the signal producing effects to effect masking.

The impedance altering components preferably includes elements having electrically resistive, capacitive, inductive properties and may be discrete active or passive electronic, electrical, electromechanical components and complex circuits or solid state devices. While illustrated as a single element, the impedance altering components 311 may be made up of multiple components or circuits grouped together physically, or may be separated.

Because a powered device may have characteristics such as harmonics which may be transient or continuous relative to the operation of the device, the masking system 100 may include devices such as filters that may applied in coordinated fashion as discussed below, or may be applied continuously. In any case, application of filters and similar devices or circuits to remove powered device characteristics from a system is considered masking effort.

The impedance altering components 311 are directly controlled by a switching module 312. The switching module 312 is itself controlled in part by a signal processing unit 313 that includes timing and logic and memory functions and communication abilities.

A sensing circuit 314 is connected to the conductors of the power delivery system 301 and is configured to sense or detect the initiation events in the power delivery system. The sensing circuit connections may include direct electrically conductive continuity such as is typically used for voltage measure, and also include inductive connection such as is often used for current measurement. Both are considered a functional connection herein. An initiation event may be any predetermined signal originating from a targeted device of interest. An initiation event functions to provide a temporal baseline for masking efforts. The output of the sensing circuit 314 is conveniently processed by an Analog-to-Digital (AD) converter 315 before passing to the signal processing unit 313. Each of the switching module 312, signal processing unit 313, the sensing circuit 314 and the AD converter 315 are connected to a power supply 320. Filters 330 are also provided to enable static filtering of signal components as part of a masking scheme.

In operation, the sensing circuit 314 detects an initiation event in the associated power delivery system in which are connected one or more power consuming devices, one or more of which may be targeted devices of interest for masking. The sensing circuit 314 convey information to the signal processing unit 313, through the converter 315. The signal processing unit 313 includes predefined algorithms or programs or other determining elements that specify a masking effort or event as well as information defining characteristics of powered devices to be masked. The signal processing unit 313 controls the switching module 312 which in turn controls the impedance altering components 311 to apply the desired components to the power delivery system 301.

In alternative configurations or methods of operations, the introduction of impedance altering components may also be based on predetermined or detected characteristics of powered devices in the powered device 302, rather than real-time operational events. Such characteristics may include such as device typical operational durations and typical daily hours of operation. Depending on the desired masking objective, impedance altering components maybe introduced on a random or nonrandom time basis, in coordination with the timing of device operations. In this way, the impedance profile over time of the power system may be altered to introduce additional features masking device operation. Such features include "false-positive" signal features that mimic device characteristics.

The particular arrangement of components of the masking system 100 is not critical and components may be combined in various different ways or integrated into a single module. Similarly the masking system 100 may be configured to provide a pass-through element allowing powered devices 302 to the connected to the power supply system through the masking system 100.

The requirements to prevent remote or external monitoring of discrete electric power supply systems depend on the ability within the external monitoring system to discern the unique characteristics of a target device(s) and prior knowledge of said characteristics of said target device. That is, masking efforts need only be slightly more sophisticated than the monitoring capabilities of an entity attempting to monitor a discrete electric power supply system. (I.e. spy on an individual or residence.) As monitoring capabilities within the system become more sophisticated, they will be able to discern characteristics of an expanding universe of devices. Future embodiments of the present invention may include additional types of filters, masking systems, phase shifting systems, device spoofing, or other methods known in the art to provide effective signal alteration and security.

Operation Independent of Initiating Event and Other than Initiation Event

In order to ensure that outside actors, individuals or entities with nefarious purposes or purposes that are not expressly authorized by the people residing within homes or operating businesses do not monitor or tack the activities of these residents, it is necessary to distort and disguise the signals that certain electronics and electrical products make when turned on or off, or operated over a period of time. The present invention provides a method for altering electrical power delivery system electrical characteristics to mask some or all of the characteristics of certain electrical and electronic devices that may emanate or otherwise be tracked or measured outside the residence or commercial property during transients such as start-up, operations, or shutdown, or during communication with other NILM smart devices. The methods used to obfuscate and mask signals included: oscillating the electrical power delivery system voltage or current; changing real, reactive and/or apparent power;

modifying the current to voltage phase, as well as creating simulated or dummy electrical/electronic device signatures.
distortion through creation of a slow current draw.

A method and a device that will use steady-state operation parameters and the termination edge parameters, as well as previously claimed initiation edge parameters (taken as initiation edge), for masking purposes. This is to clarify that obfuscation of electrical devices may occur in part or in totality with the actual electrical transient of a device. Initiation edge obfuscation is the most effective technique and most challenging, but the steady state or transient time and the closing or termination edge of a devices operation are also useful for the same purposes and add variabilities as well as efficiencies in performing obfuscations. As provided in FIG. 5, an operating curve for a powered device may include a leading edge from the initiation of the device, a peak illustrating the additional current or voltage used in the initiating event, or a standard operating characteristic (either voltage or current) that the powered devices operates from during normal operation. Likewise, traling edges from securing equipment may have unique characteristics. The techniques for obfuscation/masking need to vary with the technology of the NILM and the disaggregation and data analyzing software.

For Example: If matching libraries are utilized by NILM, distorting only transient characteristics may suffice in achieving obfuscation and result in greater efficiencies such as; power consumption and therefore operation cost of inventive device, size of impedance varying circuits, amplitude and scope of perturbances on the distribution system, and therefore greater efficiency in targeting for obfuscation when initiation and termination edges require much more precise responses.

Figure 7A:
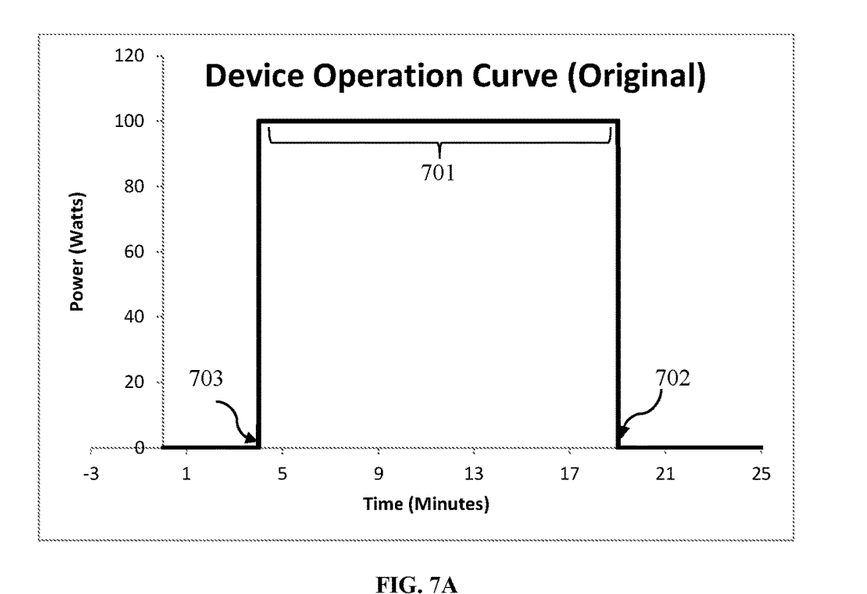
FIG. 7A demonstrates a device characteristic curve of power over time illustrating an example of an unmasked device operating curve including a 703 initiating edge of a transient, 701 steady-state operation or middle of the transient and 702 the terminating edge of the transient.

Illustratively, FIG. 7A demonstrates a device characteristic curve of power over time illustrating an example of an unmasked device operating curve. It should be appreciated that for each powered load that is added a characteristic curve similar as to what is provided in FIG. 7A is created. Typical curves include a 703 initiating edge of a transient, 701 steady-state operation or middle of the transient and 702 the terminating edge of the transient. It is further appreciated that initial surges may involve an initial higher power characteristic to compensate for large currents, particularly for those loads which involve pumps, motors, compressors, or fans.

Figure 7B:
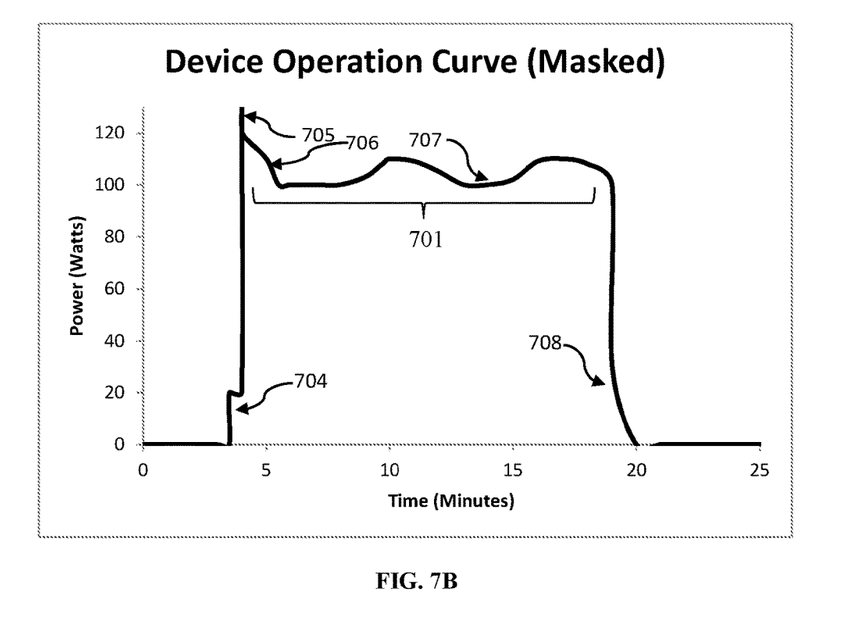
FIG. 7B demonstrates a device characteristic curve of power over time illustrating examples of how a device operating curve may be altered by the present invention which includes a 704 pre-leading edge distortion, a 705 additional power signature additive to the leading edge to mask the starting signature, a 706 addition of a signal characteristic (30W) along with the slow removal, 707 distortion of the steady-state operation signal, an 708 back edge distortion through creation of a slow current draw.

As provided herein, in certain embodiments, masking or obfuscation of powered devices by the inventive devices or methods may be desired at times other than at the initiation of a powered device, and obfuscation may occur multiple times across a powered devices operating cycle. FIG. 7B, for example, demonstrates a device characteristic curve of power over time illustrating examples of how a device operating curve may be altered by the present invention which includes a 704 pre-leading edge distortion, a 705 additional power signature additive to the leading edge to mask the starting signature, a 706 addition of a signal characteristic (30W) along with the slow removal, 707 distortion of the steady-state operation signal, an 708 back edge.

Figure 8:
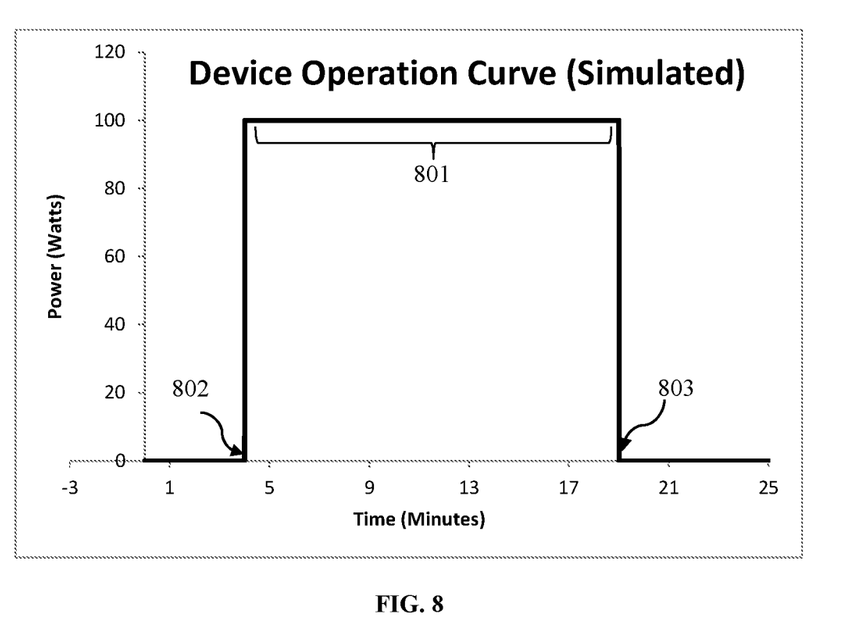
FIG. 8 demonstrates a simulated device transient by the present invention to the electrical power system for a device which does not exist.

At least one embodiment of the invention includes methods for obfuscation that stores energy and injects the stored energy at random patterns and intervals into the power system to confuse or otherwise distort the powerline signals measured outside the residence unit or commercial space. By deploying impedance components such as power/super capacitors, inductive reactors, and internal high capacity batteries the invention is able to alternatively store or inject energy. Random pattern matching algorithms alternatively store or inject energy enhance unpredictability thereby increasing security. This technique is illustrated in FIG. 7B through the 704 pre-leading edge distortion, a 705 additional power signature additive to the leading edge Simulated Devices It should be appreciated that in a similar manner that powered signals can be altered by the inventive devices and methods disclosed herein, that certain embodiments may simulate powered devices which do not exist. FIG. 8 contemplates a simulated signal being seen at an NMLI monitoring point of a device which does not exist in the connected electrical powered system. Similar to a normal operating characteristic, the simulated device operating signature would include an 802 leading edge transient, a 801 steady-state operation or middle of the transient and 803 the terminating edge of the transient. In at least one embodiment, powered device simulation is used to achieve obfuscations or masking. Such simulations thus confuse information which may be obtained through NMLI monitors, and ultimately masking what powered devices are used on the premises by simulation of non-existent devices.

Algorithms

In at least one embodiment of the invention, programming and mathematical computations that regulate processor operation and allow the apparatus to vary the impedance of loads and energy storing and discharging components to achieve obfuscations, simulations, and communications.

Low Pass Filter

In at least one embodiment of the invention the low pass filter function is expanded to include noise filtration and harmonic source phase-encoding to support enhanced obfuscation and improved communication with the invention. The low pass filter may be tuned to support national and standard standards such as 60 HZ in North America and 50 HZ in the European Union. The filter is also constructed to attenuate impedance characteristics that diminish NILM device signature acquisition. The low pass filter will improve power line quality by attenuation of all but the ideal sinusoidal waveform. Low pass filtration will create boundaries for PLC (Powerline Communication). Privacy and security requires that boundaries within a structure: residential, commercial, and mixed use, for safe containment within specified network. The Low Pass Filter is switched in and out of the distribution system as needed to allow exportation of data through boundaries by in the electrical distribution system.

Unique Powerline Communications

In at least one embodiment of the invention, powerline communications, PLC, is accomplished by the introduction of modulated of the electrical power delivery system's alternating current (AC). Modulation includes but is not limited to alteration of impedance characteristics and the drawing, or injection of energy into the electrical power delivery system for the purpose of communication with NILM capable smart metering, other NILM devices, and additional Inventive device devices installed in the distribution system. These devices allow for development of a private communication network within an otherwise public distribution system. PLCs may also be installed within loads, in the after-market or during original manufacture. The invention will communicate in a manner, using methods which will reliably relay information about a specific device. That information which may include make, model number, serial number, operating state, and other information as necessary to accomplish its purposes. Communication of this information is desirable in support or home automation, load management or balancing, product testing and improvements, and preventive maintenance and energy efficiency.

In one embodiment of the invention, a product identifier code address (PIC address), a unique identifier assigned to the device, will be transmitted along with operational characteristics of the device, which may include, but is not limited to, base line transient data to a home automation system. The transmission of the PIC address at the initiation transient and at fixed intervals during steady-state operations until the termination transient will allow the home automation system to better manage system loads, to shift loads to operate at optimal times, and to track performance the load over time for preventive maintenance and energy efficiency purposes.

In another embodiment of the invention, the PIC address may be transmitted to the utility company to allow them to track the PIC address and operational transient data for purposes related to improved management of loads on the power grid and overall management of the power grid.

In yet another embodiment of the invention, the PIC address may be transmitted to one or more third parties for purposes beneficial to the consumer. Purposes may include, but are not limited to, preventive maintenance, promotional offers, and cyber as well as physical security.

Additional information that may be transmitted include load error codes, operational modes, and many as of yet unforeseen data applications.

PLC includes transmission of data, recovery of data, and controlling functions within the electrical power delivery system from an NILM Smart device in electrical contact with the electrical power delivery system. Other embodiments may include capacitive or inductive contact with the electrical power delivery system, wireless and data-mesh networking between a system of controls, the NILM Smart device, and one or more loads on the electrical power delivery system.

The communications protocol include transmission of a modality, and the ability to introduce at least one variant into the system. In the preferred embodiment of the method of communication, 8 Hz frequencies are superimposed upon a 50 or 60 Hz powerline. 8 Hz frequencies are 100 times higher than 60 Hz of the power grid (50 Hz in Europe) which aids in filtering, speeds communications and is outside of the range of powerline noise so as not to be interfered with existing powerline noise.

The duration of the frequencies being superimposed, which may be one or two half cycles of a complete powerline AC cycle, is optimized for the noise of the environment and number of loads in operation. An AD converter, which may or may not be the same AD converter that measures the powerline voltages to determine an initiating event, streams the data into a buffer.

In one embodiment the buffer analyzes powerline frequencies using a Fourier Transform function track and measure existing frequencies on the line, and control communications accordingly. Using existing industry standard data communication protocols facilitates incorporation of data acquisition and data transmission into smart metering and NILM devices.

The invention claimed is:

1. A method of masking electrically electrical loads connected to an electric power system, the method comprising:
maintaining electrical connection with a power system connected to at least one electrical load;
detecting at least one electrical signal associated with the operation of at least one electrical load connected to said power system;
introducing circuit elements to the power system to alter the impedance elements of the power system to mask said at least one electrical signal of said at least one electrical loads.

2. The method of claim 1 wherein the electrical signal is an initiation event associated with starting of the operation of said at least one electrical load, a steady operating profile for the normal operation of the electrical load, a termination or alteration in the operating profile of the electrical load, the sensing of the alteration of circuit impedance, or the sensing of the addition or removal of one or more operating frequencies.

3. The method according to claim 1 further comprising, detecting one or more subsequent electrical signals of said at least one electrical loads and altering said impedance elements of the power system to mask said subsequent electrical signal.

4. The method according to claim 1 further comprising, determining at least one electrical characteristic of each of the electrical loads.

5. The method according to claim 3 wherein said operational transient has a determined amplitude.

6. The method according to claim 1 further comprising, altering said impedance elements repeatedly to the power system during repeated operational cycles of said at least one electrical loads, wherein each introduced impedance altering circuit element has at least one unique relative timing aspect or at least one unique impedance value.

7. The method of claim 1 wherein said impedance element is altered to produce, in operational combination with the electrical characteristic amplitude of the powered device, a combined electrical characteristic amplitude which differs from the electrical characteristic amplitude of the powered device of at least ten percent.

8. The method of claim 1 wherein said circuit elements introduced to the power system upon detection of a subsequent operational transient is varied in relation to previous circuit elements introduced for said powered device.

9. The method of claim 1 wherein said circuit elements introduced to the power system upon detection of an operational transient are random.

10. The method of claim 1, wherein said circuit elements are introduced to mask the total or partial initiation edge, total or partial termination edge or the total or partial steady-state operation or the said at least one electrical signal.

11. The method of claim 1 wherein said circuit elements are impedance altering components applied to create artificial load signatures representing specific appliances and electrical devices along for inclusion into the load profile gathered by NILM devices.

12. The method of claim 11 wherein the artificial load signatures includes an operating times and operating characteristics of said specific appliances and electrical devices.

13. A system for inhibiting detection of electrical loads connected to an electric power system comprising:
a sensor configured to be connected to a power system and capable of detecting changes in voltage and current in the power system;
a processor including operational transient impedance data associated with each of a multiple electrical loads, said processor configured to receive detection signals from the sensor; and a masking means for introducing circuit elements to the power system to alter the impedance elements of the power system in coordination with the occurrence of powered device operational transient.

14. A method for inhibiting detection and monitoring of electrical loads within a power system, the method comprising:
 determining electrical characteristics of at least one powered device connected to a power system;
 repeatedly introducing impedance altering elements to the power system in coordination with multiple operational periods of the at least one powered device to alter the electrical profile of the power system to mask the electrical characteristics of at least one operational transient of said at least one powered device.

* * * * *